United States Patent [19]

Barnett

[11] Patent Number: 4,879,149

[45] Date of Patent: Nov. 7, 1989

[54] BOOK BINDING REINFORCEMENT

[75] Inventor: Charles J. Barnett, Akron, Ohio

[73] Assignee: Kent Adhesive Products Co., Kent, Ohio

[21] Appl. No.: 182,221

[22] Filed: Apr. 15, 1988

[51] Int. Cl.[4] .......................... B32B 3/10; B32B 7/06; B32B 7/10

[52] U.S. Cl. .......................................... 428/41; 412/15; 428/43; 428/55; 428/136; 428/155

[58] Field of Search ..................... 428/483, 511, 537.5, 428/136, 155, 41, 43, 55, 56; 412/37, 15

[56] References Cited

U.S. PATENT DOCUMENTS

| | | | |
|---|---|---|---|
| 2,956,703 | 10/1960 | Royal | 428/41 |
| 3,847,718 | 11/1974 | Watson | 428/55 |
| 4,496,617 | 1/1985 | Parker | 428/55 |
| 4,520,055 | 5/1985 | Jeter | 428/55 |

*Primary Examiner*—George F. Lesmes
*Assistant Examiner*—J. Davis
*Attorney, Agent, or Firm*—Renner, Kenner, Greive, Bobak, Taylor & Weber

[57] ABSTRACT

An apparatus and technique for strengthening and reinforcing book bindings. A laminate having a polyester face sheet is coated on one side with adhesive. A backing sheet is releasably secured to the adhesive. The backing sheet is split down the center thereof to define a removable center strip with adjacent side strips on each side thereof. These three strips facilitate the method of application of the laminate to reinforce and secure a book binding.

3 Claims, 1 Drawing Sheet

BOOK BINDING REINFORCEMENT

TECHNICAL FIELD

The invention herein resides in the art of book repair apparatus and techniques. More particularly, the invention relates to a structure and technique for strengthening and reinforcing bookbindings, and particularly bindings for paperback books.

BACKGROUND ART

It is known that books are typically of either a "hardback" or "paperback" nature. Hardback books are typically more durable and correspondingly more expensive. In hardback books, there is generally a good binding between the hard cover and the spine of the book where the pages are joined together. In contradistinction, paperback books are typically inexpensive and less durable, having a binding of the cover to the spine which is significantly less secure than that of hardback books. Accordingly, the cover on paperback books often tears from the spine of the book rendering the book less useful and attractive, exposing the pages thereof to wear and tear.

Heretofore, it has been known to strengthen and protect the paperback cover by the application thereto of a plastic cover sheet. Such a concept is shown in co-pending application Ser. No. 911,469, filed Sept. 25, 1986, and now U.S. Pat. No. 4,744,592. While the structure and technique of that prior art demonstrates a means for protecting the cover itself, there is no teaching in the art of a means to strengthen and reinforce the binding of the cover to the spine.

Accordingly, there is a need in the art for a reliable, durable, inexpensive, and easy-to-use structure and technique for securing and reinforcing the interconnection between a paperback cover and the book itself.

DISCLOSURE OF INVENTION

In light of the foregoing, it is a first aspect of the invention to provide a laminate and method for reinforcing bookbindings.

Another aspect of the invention is the provision of a laminate and method for reinforcing bookbindings which is easy to implement.

Still a further aspect of the invention is to provide a laminate and method for reinforcing bookbindings which results in a durable and reliable reinforcement and which is economical in implementation.

The foregoing and other aspects of the invention which will become apparent as the detailed description proceeds are achieved by a laminate for reinforcing a book binding, comprising: an elongated backing member longitudinally cut along the length thereof; an elongated face strip congruent with said backing member; and an adhesive layer interconnecting said backing member and face strip.

Other aspects of the invention which will be appreciated from the following are attained by a method for reinforcing a book cover to its binding, comprising the steps of: removing a first strip of a backing sheet of an adhesive laminate, thereby exposing a first area of an adhesive layer maintained upon a back side of a face sheet; and securing said exposed first area of said adhesive layer to an edge of a spine of the book along a line where the book cover and a first interior page meet.

DESCRIPTION OF DRAWING

For a complete understanding of the aspects, techniques and structure of the invention, reference should be had to the following detailed description and accompanying drawing wherein.

BEST MODE FOR CARRYING OUT THE INVENTION

Figure 1:
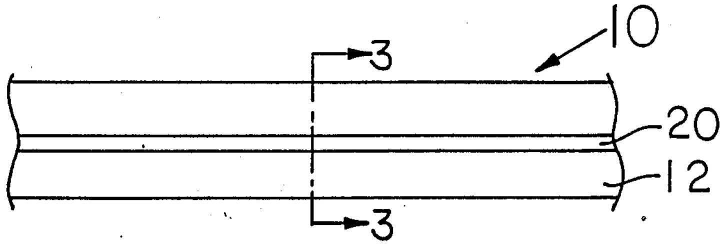
FIG. 1 is a top plan view of the laminate of the invention.
Figure 2:
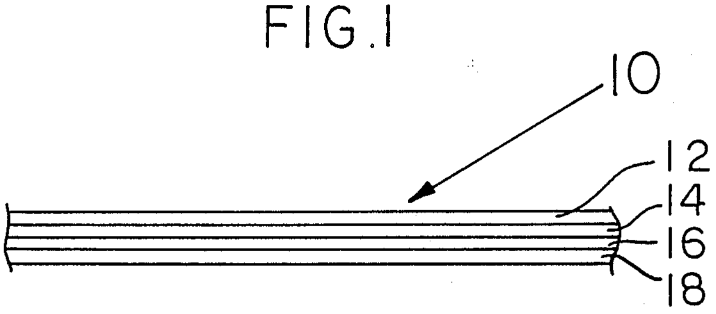
FIG. 2 is a side elevational view of the laminate of FIG. 1.

Referring now to the drawing and more particularly FIGS. 1 and 2, it can be seen that a laminate according to the invention is shown generally by the numeral 10. As illustrated, the laminate 10 is of a strip or elongated nature, typically suited for maintenance upon a roll from which desired lengths may be cut. As shown, the laminate 10 includes a backing sheet or strip 12 which may be of any desired nature, but is most preferably a clay-coated craft paper. Covering the inner side, the backing strip 12 is a release layer or coating 14, typically being silicone based. An adhesive layer 16 is releasably attached to the release layer 14 and is permanently secured to the face layer of film 18. It will be appreciated that the various elements and layers 12–18 just described are congruent.

In a preferred embodiment of the invention, the film 18 is polyester having a thickness on the order of 0.5–3.0 mil, and preferably 1.0 mil. The adhesive layer 16, while of any suitable type, is preferably a non-acetic emulsion acrylic.

Figure 3:
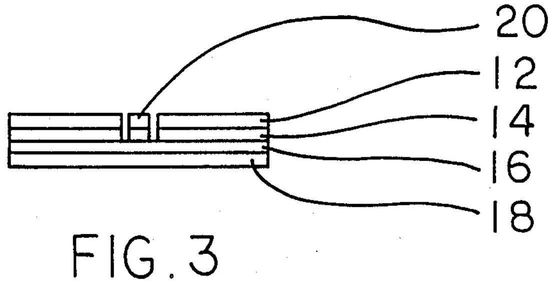
FIG. 3 is a cross-sectional view of the laminate of FIG. 1 taken along the line 3—3.
Figure 4:
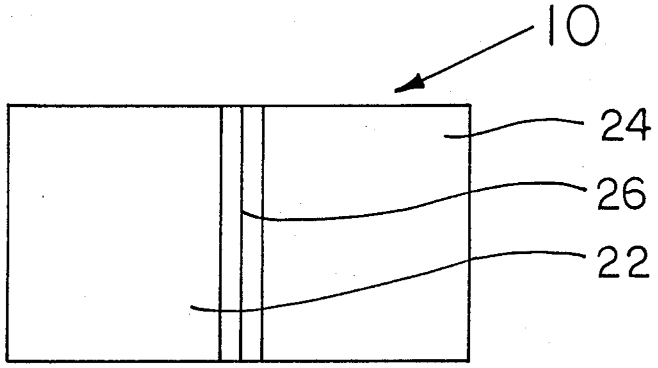
FIG. 4 is a top plan view of a paperback book employing the structure of the invention.

With reference to FIGS. 1 and 3, it can be seen that the laminate 10 is characterized by a longitudinal strip 20 which is appropriately cut through the backing layer 12 and release layer 14 to the adhesive layer 16 The strip 20 may be formed by any of various suitable methods such as razor cutting or die cutting. The strip 20 is preferably cut parallel to the side edges of the laminate 10 and spaced equidistant therefrom such that the strip 20 defines strips adjacent either side thereof which are of identical width. It is, however, within the concept of the invention to position the longitudinal strip 20 other than at the center of the backing strip 12 to define strips on either side thereof which are other than equal.

For purposes which will become apparent hereinafter, the various dimensions of the laminate 10 may vary. Preferably, the longitudinal strip 20 is a width of 1/16–⅜ inch, and most preferably ⅛ inch. Similarly, the overall width of the laminate 10 is preferably on the order of ¾–3¾ inch and, most preferably, the width is 1¼ inch. It will be appreciated that the larger widths, on the order of 3¾ inch, may be used to repair hardback books, while paperback books can typically be repaired with laminates having a width on the order of 1¼ inch. Larger paperback and small hardback books may be repaired with in-between widths such as 2½ inch.

The use of the laminate 10 to repair or reinforce the binding of a book cover to its spine will now be considered. As mentioned before, the laminate 10 is typically maintained as roll stock upon a roll of appropriate size. In the event that a cover has begun to separate from its book or, in the event that the owner simply wants to reinforce the secured engagement of the cover to the book, an appropriate length of laminate 10 is cut from its roll, such length being slightly less than the length of the spine itself. Typically, the section of the laminate 10 will be cut to be ¼–1 inch less than the length of the spine, and most preferably ½ inch less than the length thereof. With such a length cut, the longitudinal strip 20 is removed, exposing the adhesive layer 16 therebelow. A straight edge is then brought into contact with the face sheet of film 18 on the front side thereof, opposite the exposed line of the adhesive layer 16. The laminate 10 is then bent or folded back upon the straight edge, defining an exposed line of adhesive along the straight edge. This line of adhesive is then brought into engagement with the line defined by the interconnection of the book cover 22 and the first inside page 24 as defined by the exposed edge of the spine 26. The thin edge of adhesive is thus secured along this line. Next, one side of the backing strip 12 is removed to expose the adhesive therebeneath. That side is then adhered to either the cover 22 or the page 24 depending upon which side of the backing was removed. Next, the remaining piece of the backing 12 is removed to expose the adhesive therebeneath and that adhesive is then secured to either the inside page 24 or the cover 22. The film 18 and adhesive 16 is, of course, rubbed to smooth out the interconnection between the film 16 and the cover 22 and page 24.

The process just discussed is, of course, repeated for both the front and the back cover, requiring that two strips of laminate 10 be cut and sequentially stripped and secured as just described. The polyester film provides secured engagement which is extremely difficult to tear or remove. Accordingly, the book cover is bound and reinforced to the book, stronger than before, allowing the book to withstand extensive use.

It will be appreciated that the reinforcement structure and technique just described is simple to use by an individual. Removal of the longitudinal strip 20 and placement of the face sheet or film 18 upon a straight edge allows the user to accurately align the exposed line of adhesive with the line of interconnection defined along the edge of the spine where the cover 22 is supposed to mate with the page 24. Once that engagement is made, the straight edge may be removed and the side pieces of the backing 12 may be sequentially removed and the correspondingly exposed adhesive layers secured to the cover or page. In the event that the exposed line of adhesive is misaligned with the line of interconnection, its narrow width allows for ready removal and realignment before the side pieces are removed.

Since the weakest part of a paperback book is typically its binding, the apparatus and technique presented above provides a means for improving the general integrity of paperback books, allowing them to present certain of the beneficial characteristics of hardback books.

It has also been found that the laminate 10 is well adapted as a means for simply repairing torn pages in a book. The three piece removal of the backing allows for ease of positioning, while the non-acetic nature of the adhesive prevents "yellowing" of the mended area.

Thus it can be seen that the objects of the invention have been satisfied by the structure presented hereinabove. While in accordance with the patent statutes, only the best mode and preferred embodiment of the invention has been presented and described in detail, it is to be understood that the invention is not limited thereto or thereby. Accordingly, for an appreciation of the true scope and breath of the invention, reference should be had to the following claims.

What is claimed is:

1. A laminate for reinforcing a book binding comprising:

an elongated backing member longitudinally cut along the length thereof by a pair of parallel cuts spaced apart by 1/16–⅜ inch;

an elongated face strip congruent with said backing member, said backing member and face strip being ¾–3¾inches wide;

an adhesive layer interconnecting said backing member and face strip; and wherein removal of said backing member between said pair of parallel cuts exposes a thin line of adhesive for securing contacting engagement of said face strip to an edge of the book binding.

2. The laminate according to claim 1 wherein said face strip comprises a polyester film.

3. The laminate according to claim 2 wherein said adhesive comprises a non-acetic emulsion acrylic.

* * * * *